US012759471B2

(12) United States Patent
Rutman et al.

(10) Patent No.: US 12,759,471 B2
(45) Date of Patent: Oct. 13, 2026

(54) BASE PLATE ATTACHMENT STRUCTURE

(71) Applicant: Ford Global Technologies, LLC, Dearborn, MI (US)

(72) Inventors: Matthew B. Rutman, Westland, MI (US); Eric Scott Levine, Novi, MI (US); Todd Rakus, Windsor (CA); Jeffrey R. Sturges, Grosse Pointe Farms, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 440 days.

(21) Appl. No.: 18/235,434

(22) Filed: Aug. 18, 2023

(65) Prior Publication Data

US 2025/0058717 A1 Feb. 20, 2025

(51) Int. Cl.

| | |
|---|---|
| ***B60R 11/00*** | (2006.01) |
| ***B60P 7/08*** | (2006.01) |
| ***B60R 9/06*** | (2006.01) |
| ***B60R 13/01*** | (2006.01) |
| ***B62D 33/02*** | (2006.01) |

(52) U.S. Cl.

CPC ............ *B60R 11/00* (2013.01); *B60P 7/0807* (2013.01); *B60R 9/06* (2013.01); *B60R 2011/0078* (2013.01); *B60R 13/01* (2013.01); *B62D 33/02* (2013.01)

(58) Field of Classification Search

CPC ....... B60R 2011/005; B60R 2011/0061; B60R 2011/0064; B60R 2011/0073; B60R 2011/0078; B60R 9/06; B60R 13/01; B62D 33/0207; B62D 33/02; B60P 7/0807

USPC ............ 248/220.31, 220.41, 220.42, 220.43; 224/542

See application file for complete search history.

(56) References Cited

U.S. PATENT DOCUMENTS

| | | | | | |
|---|---|---|---|---|---|
| 2,386,343 | A * | 10/1945 | Regenhardt | A47B 87/02 | 312/111 |
| 3,031,161 | A * | 4/1962 | Hawie | A47F 5/0823 | 248/222.12 |
| 3,669,278 | A * | 6/1972 | Heroy | A47F 5/005 | 211/184 |
| 3,858,996 | A * | 1/1975 | Jarvis | F16B 5/008 | 403/334 |
| 4,027,892 | A * | 6/1977 | Parks | B60P 7/0892 | 410/121 |
| 4,941,784 | A * | 7/1990 | Flament | B60R 7/02 | 410/121 |
| 4,942,968 | A * | 7/1990 | Fast | A47F 5/005 | 211/184 |

(Continued)

FOREIGN PATENT DOCUMENTS

| | | | |
|---|---|---|---|
| CA | 3077977 | A1 | 10/2021 |

*Primary Examiner* — Justin M Larson

(74) *Attorney, Agent, or Firm* — Vichit Chea; Carlson, Gaskey & Olds, P.C.

(57) ABSTRACT

An accessory attachment system includes a base plate having a plurality of mounting apertures and an accessory having a primary surface with an attachment interface and a secondary surface providing a support structure to hold one or more items. The attachment interface comprises one or more tabs that are bent outwardly of the primary surface and received within selected mounting apertures of the plurality of mounting apertures.

17 Claims, 7 Drawing Sheets

(56) References Cited

U.S. PATENT DOCUMENTS 5,599,055 A * 2/1997 Brown ............... B62D 25/2054 410/97
5,788,310 A * 8/1998 McKee ................... B60R 13/01 410/80
6,098,821 A * 8/2000 Dube ................... A47B 57/588 211/184
6,481,604 B1 * 11/2002 Beene ....................... B60R 9/00 224/543
6,503,036 B1 * 1/2003 Bequette ............... B60P 7/0815 410/121
6,648,569 B2 * 11/2003 Douglass .............. B60P 7/0892 410/46
7,562,850 B2 * 7/2009 Martin ................. H01R 25/006 211/49.1
7,854,101 B2 * 12/2010 Swayne .................. B60R 13/04 52/716.5
8,011,692 B2 * 9/2011 Friesen ................... B60R 11/06 280/759
8,205,910 B2 * 6/2012 Leonard ............. B60N 2/01575 280/781
8,303,221 B2 * 11/2012 Lenz ..................... B60P 7/0815 410/121
9,434,292 B2 * 9/2016 Welch .................... B62D 33/02
9,636,429 B2 * 5/2017 Cushion ................. A61B 50/34
10,259,508 B2 4/2019 Leitner
10,557,275 B2 * 2/2020 Lescord .................... E04G 1/36
10,583,962 B2 3/2020 Brunner et al.
10,647,267 B2 * 5/2020 Briggs .................... B60R 13/01
10,703,534 B2 7/2020 Brunner et al.
D895,966 S 9/2020 Brunner et al.
D895,967 S 9/2020 Brunner et al.
D896,517 S 9/2020 Brunner et al.
D896,518 S 9/2020 Brunner et al.
D897,103 S 9/2020 Brunner et al.
D898,320 S 10/2020 Brunner et al.
10,870,453 B2 * 12/2020 Elder ...................... B60R 9/052
10,933,796 B2 * 3/2021 Beenen ..................... B60R 9/06
10,962,218 B2 3/2021 Plato et al.
10,981,696 B2 4/2021 Brunner et al.
D917,977 S 5/2021 Brunner et al.
D918,584 S 5/2021 Brunner et al.
D919,296 S 5/2021 Brunner et al.
11,008,136 B2 5/2021 Brunner et al.
D920,671 S 6/2021 Brunner et al.
11,027,883 B1 6/2021 Brunner et al.
D923,935 S 7/2021 Brunner et al.
11,192,690 B1 12/2021 Brunner et al.
11,268,691 B2 3/2022 Plato et al.
11,279,421 B1 * 3/2022 Hoogendoorn ........... B60R 9/06
11,325,659 B2 * 5/2022 Mannone .............. B60P 7/0815
11,365,026 B2 6/2022 Brunner et al.
11,427,382 B2 8/2022 Brunner et al.
11,465,805 B2 10/2022 Brunner et al.
11,577,661 B2 * 2/2023 Reband ................... B60R 11/00
11,648,991 B2 5/2023 Kananda
11,952,171 B2 * 4/2024 Lam ..................... B65D 21/083
11,964,632 B2 * 4/2024 Rutman ................ B60P 7/0815
12,049,197 B2 * 7/2024 Hoogendoorn ....... B60P 7/0815
12,110,032 B2 * 10/2024 Salter ................. B62D 33/0207
12,142,935 B2 * 11/2024 Thomas .................. H02J 50/10
12,184,086 B2 * 12/2024 Rutman .................. H01F 38/14
12,221,071 B2 * 2/2025 Levine .................... B60R 9/065
12,258,075 B2 * 3/2025 Rutman ................ B60P 7/0815
12,296,744 B2 * 5/2025 Salter ........................ B60P 7/10
12,337,746 B1 * 6/2025 Phillips .............. B62D 33/0207
12,344,154 B2 * 7/2025 Beenen ..................... B60R 9/06
12,344,197 B2 * 7/2025 Rutman ................ B60P 7/0815
12,380,401 B2 * 8/2025 Salter ...................... B60P 3/007
2001/0004157 A1 6/2001 Lance et al.
2008/0029471 A1 * 2/2008 Hurt ...................... A47F 5/0815 211/119.004
2008/0029666 A1 * 2/2008 Hurt ...................... A47F 5/0815 248/220.41
2010/0176016 A1 * 7/2010 Pell ........................ A61B 50/33 206/370
2016/0229356 A1 * 8/2016 Nolan ..................... B60R 11/06
2024/0051470 A1 * 2/2024 Salter ........................ B60R 9/06
2024/0166121 A1 * 5/2024 Salter ...................... B60R 11/06
2024/0253711 A1 * 8/2024 Rutman ............... B62D 33/023
2024/0262295 A1 * 8/2024 Rutman .................... B60R 9/06
2024/0262300 A1 * 8/2024 Rutman .................. B60R 13/01
2024/0262304 A1 * 8/2024 Rutman .................. B60R 16/03
2024/0399950 A1 * 12/2024 Rutman .................... B60P 7/10
2024/0409036 A1 * 12/2024 Levine .................... B60R 16/03
2024/0409044 A1 * 12/2024 Levine ................ B60R 16/0215
2025/0058717 A1 * 2/2025 Rutman .................. B60R 11/00
2025/0058718 A1 * 2/2025 Rutman .................. B60R 11/00
2025/0121891 A1 * 4/2025 Rutman ............. B62D 33/0207
2025/0196763 A1 * 6/2025 Salter ..................... B60Q 1/509
2025/0263020 A1 * 8/2025 Rutman .................... B60R 9/06

* cited by examiner

BASE PLATE ATTACHMENT STRUCTURE

TECHNICAL FIELD

This disclosure relates generally to an attachment interface for securement to a base plate in a cargo area, more particularly, to an attachment structure for accessories to be easily and quickly attached to the base plate.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite. Support surfaces in cargo or work areas may be configured to securely support the accessories.

SUMMARY

In some aspects, the techniques described herein relate to an accessory attachment system, including: a base plate having a plurality of mounting apertures; and an accessory having a primary surface with an attachment interface and a secondary surface providing a support structure to hold one or more items, wherein the attachment interface comprises one or more tabs that are bent outwardly of the primary surface and received within selected mounting apertures of the plurality of mounting apertures.

In a further non-limiting embodiment of the foregoing system, the primary surface comprises a sheet metal plate.

In a further non-limiting embodiment of any of the foregoing systems, the one or more tabs are integrally formed with the sheet metal plate, with each tab comprising a base formed with the sheet metal plate and extending to a distal end that is free from contact with the sheet metal plate.

In a further non-limiting embodiment of any of the foregoing systems, the one or more tabs comprise a first set of tabs for a first accessory or a second set of tabs different than the first set of tabs for a second accessory.

In a further non-limiting embodiment of any of the foregoing systems, the first set of tabs comprises two tabs that are received within a single aperture of the plurality of mounting apertures.

In a further non-limiting embodiment of any of the foregoing systems, the second set of tabs comprises a single tab that is received within a single aperture of the plurality of mounting apertures.

In a further non-limiting embodiment of any of the foregoing systems, the single tab of the second set of tabs is greater in size than each of the two tabs in the first set of tabs.

In a further non-limiting embodiment of any of the foregoing systems, the system further includes a lock insert to secure the accessory to the base plate, wherein the lock insert is received within a lock aperture spaced from the plurality of mounting apertures.

In a further non-limiting embodiment of any of the foregoing systems, the lock aperture has a different size and/or shape than the plurality of mounting apertures.

In a further non-limiting embodiment of any of the foregoing systems, the base plate is mounted within a cargo area of a vehicle.

In some aspects, the techniques described herein relate to vehicle including: a cargo area having a bottom wall and one or more side walls; one or more base plates attached to the bottom wall and/or to one or more of the side walls; each base plate having a plurality of mounting apertures and a plurality of lock apertures, wherein each lock aperture is spaced from each mounting aperture; at least one accessory having a primary surface with an attachment interface and a secondary surface providing a support structure to hold one or more items, wherein the attachment interface comprises a plurality of tabs that are bent outwardly of the primary surface and are received within selected mounting apertures of the plurality of mounting apertures; and at least one lock insert supported by the at least one accessory and selectively securable within one lock aperture of the plurality of lock apertures.

In a further non-limiting embodiment of the foregoing vehicle, the primary surface comprises a sheet metal plate.

In a further non-limiting embodiment of any of the foregoing vehicles, the plurality of tabs are integrally formed with the sheet metal plate, with each tab comprising a base formed with the sheet metal plate and extending to a distal end that is free from contact with the sheet metal plate.

In a further non-limiting embodiment of any of the foregoing vehicles, the plurality of tabs comprise a first set of tabs for a first accessory or a second set of tabs for a second accessory, the first set of tabs comprising two tabs that are received within a single aperture of the plurality of mounting apertures and the second set of tabs comprising a single tab that is received within a single aperture of the plurality of mounting apertures, and wherein the single tab of the second set of tabs is greater in size than each of the two tabs in the first set of tabs.

In a further non-limiting embodiment of any of the foregoing vehicles, the at least one lock insert comprises a center body with a pair of opposing arms that are selectively movable between an installed position and an uninstalled position.

In a further non-limiting embodiment of any of the foregoing vehicles, each arm of the pair of opposing arms includes a grip or tang.

In some aspects, the techniques described herein relate to a method of, comprising: integrally forming a plurality of bent tabs on a primary surface of an accessory; and inserting the plurality of bent tabs through mounting apertures formed within a base plate supported within a vehicle cargo area.

In a further non-limiting embodiment of the foregoing method, the primary surface comprises a sheet metal plate, and including separating portions of each tab from the sheet metal plate leaving only a base portion attached to the sheet metal plate, and bending each tab at the base portion such that a distal end of each tab is free from contact with the sheet metal plate.

In a further non-limiting embodiment of any of the foregoing methods, the plurality of bent tabs for each accessory comprise either a first set of tabs for a first accessory or a second set of tabs for a second accessory, and including providing the first set of tabs as two tabs that are received within a single mounting aperture of the mounting apertures, and providing the second set of tabs as a single tab that is received within a single mounting aperture of the mounting apertures, and further including forming the single tab of the second set of tabs to be greater in size than each of the two tabs in the first set of tabs.

In a further non-limiting embodiment of any of the foregoing methods, the method further includes inserting a lock insert supported by the primary surface into a lock aperture that is spaced apart from the mounting apertures.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A base plate attachment system for an accessory comprises a base plate having a plurality of mounting holes that receive corresponding mounting extensions from an accessory. The base plates can be mounted to a floor structure or a wall structure. There are often situations where it would be useful for a user to be able to switch between accessories to enable different functional capabilities, or to temporarily remove an accessory or module to allow the module or its contents to be used at a different location, then reattach the accessory/module once the desired operation or task is completed. The subject disclosure provides an attachment interface for an accessory comprising a mechanical attachment that has quick connect/disconnect capability, while also providing a secure support for the accessory on the base plate.

Figure 1A:
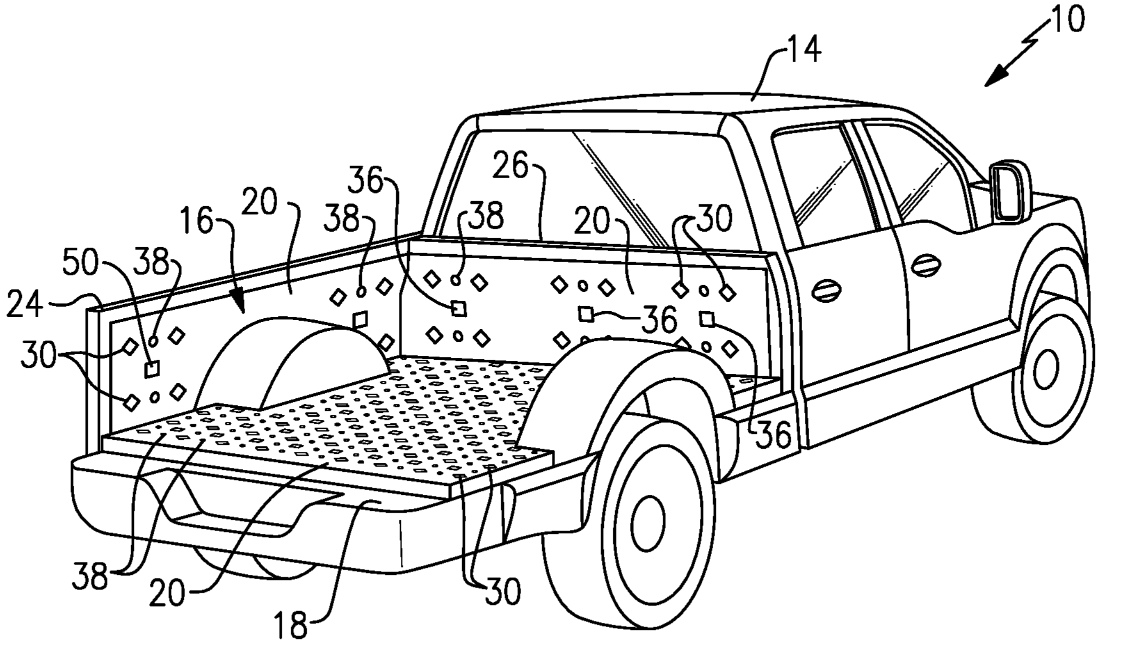
FIG. 1A illustrates a perspective view of a vehicle having a cargo bed equipped with base plates that can be used to secure an accessory according to an exemplary aspect of the present disclosure.
Figure 1B:
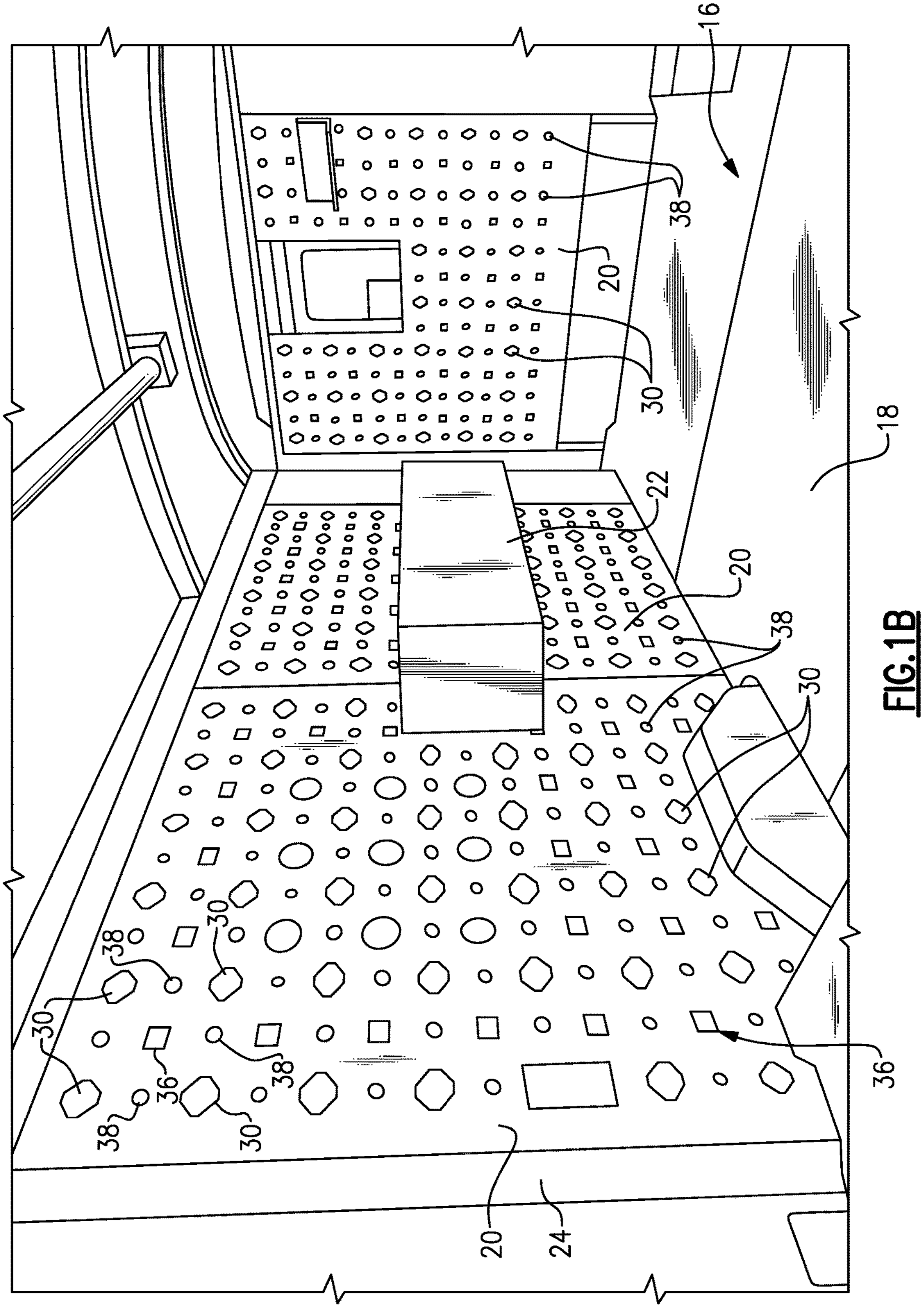
FIG. 1B illustrates a perspective view of a van having a cargo area equipped with base plates that can be used to secure accessories according to an exemplary aspect of the present disclosure.

In one example, an attachment system for accessories is used on a vehicle. With reference to FIGS. 1A and 1B, a vehicle 10 includes a passenger compartment 14 and a cargo area 16 that is aft of the passenger compartment 14. The cargo area 16 has a floor 18. In this example, the vehicle 10 is a pickup truck. However, the vehicle 10 could be another type of vehicle in another example, such as a car, van, sport utility vehicle, etc. FIG. 1B shows an example of a van that incorporates a base plate 20 with an accessory attachment system.

In the exemplary embodiment, one or more base plates 20 are used to support one or more accessories and/or modules 22. In one example, the cargo bed 16 is defined by a pair of side walls 24 (only one is shown in FIG. 1A for purposes of clarity), a rear wall 26, and a tailgate (not shown). In one example, the base plates 20 are secured directly to walls 24, 26 and/or to the floor 18 of the cargo area 16 by fastening, welding, etc., at a first connection interface. The accessories and/or modules 22 can be secured to the vehicle 10 by engaging one or more of the base plates 20 via a second connection interface between the accessory 22 and the base plate 20. The accessories/modules 22 can comprise shelves, storage baskets, tools, boxes, etc.

Figure 2:
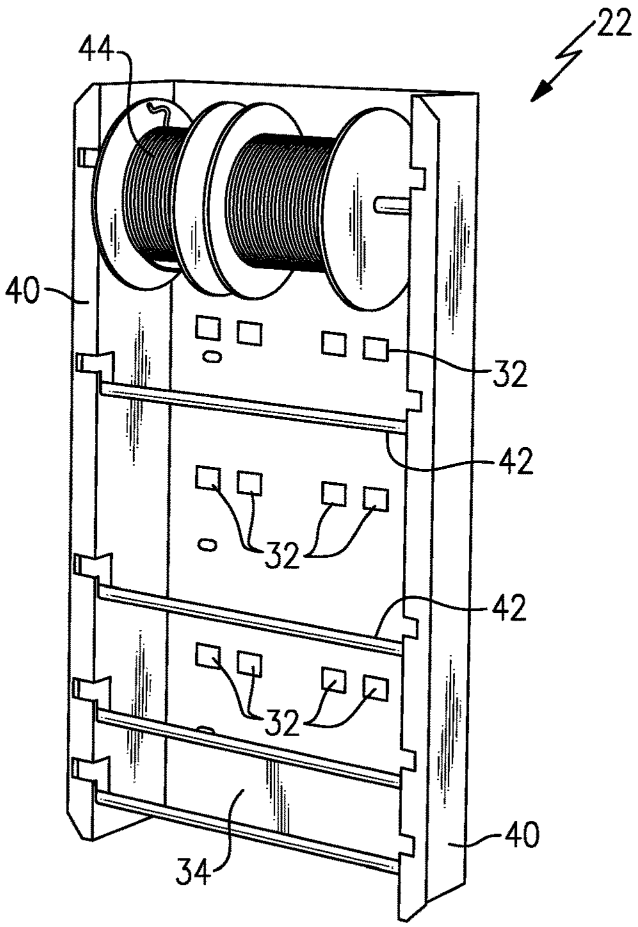
FIG. 2 is a perspective view of an example accessory.

As shown in FIGS. 1A-1B, the base plates 20 include a plurality of mounting openings or apertures 30. As shown in FIG. 2, an example accessory 22 comprises a shelf or tool support that includes one or more mounting extensions 32 shown schematically. The tool support can engage the base plate 20 using an attachment system comprising the plurality of apertures 30 and the mounting extensions 32 that cooperate to provide a mechanical connection interface. In this example, the base plates 20 provide the apertures 30 and the accessories 22 include the extensions 32. The apertures 30 are spaced upwardly from the floor 18 or side wall 24, 26 by an open gap such that the extensions 32 from the accessory 22 can be easily inserted into the base plate 20 to attach the accessory 22 to the base plate 20. The accessory 22 can then be removed and replaced with a different accessory 22 as needed.

Figure 3:
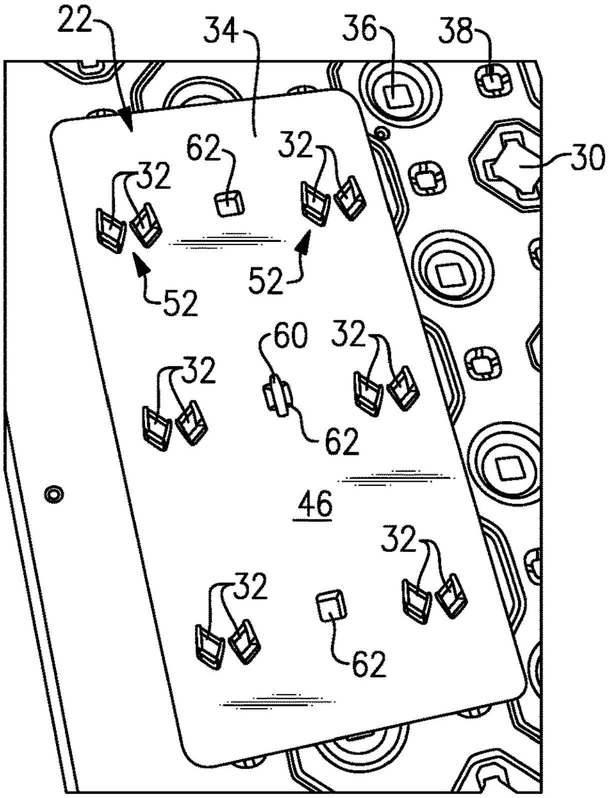
FIG. 3 is one example of an accessory attachment interface.
Figure 4:
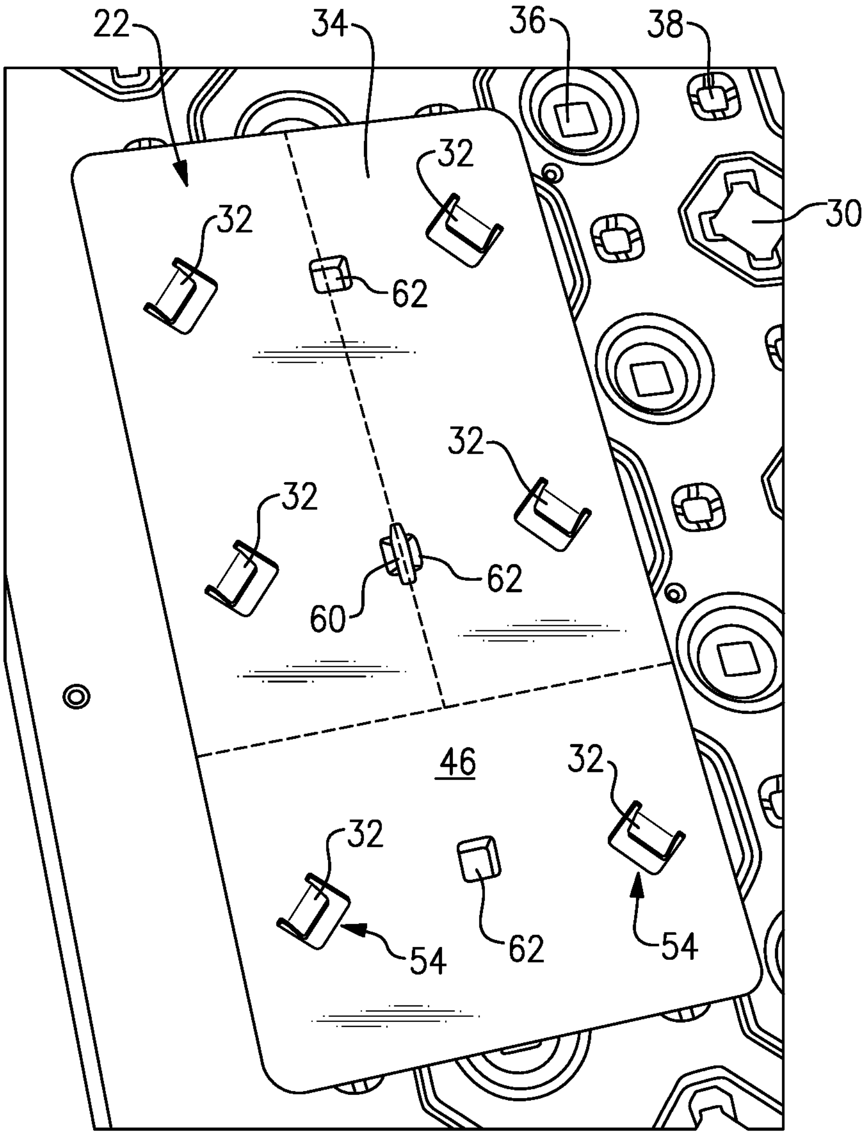
FIG. 4 is another example of an accessory attachment interface.

As discussed above, in this example, the accessory 22 comprises a tool support that is mechanically coupled to the vehicle 10 via the base plate 20. The accessory 22 includes a base surface or primary surface 34 that includes the plurality of mounting extensions 32. The accessory 22 further includes a secondary surface 40 providing a support structure 42 to hold one or more items 44. In one example, the mounting extensions 32 comprise tabs that are bent outwardly of the primary surface 34 and received within selected mounting apertures 30 as shown in FIGS. 3-4.

As discussed above, the base plates 20 can be mounted to walls 24, 26 or the floor 18 in a cargo area 16. The mounting apertures 30 are formed within the base plate 20 and comprise an accessory attachment interface. In one example, the base plate 20 also includes other openings or apertures 36 (FIGS. 1A-1B) for a power connection interface, and further includes additional openings or apertures 38 for a locking feature that allows the accessory 22 to be securely locked to the base plate 20. The power apertures 36 and locking apertures 38 are spaced apart and separate from each other and from the mounting apertures 30. These sets of apertures 30, 36, 38 are provided at multiple locations on the base plate 20, and are formed in a desired pattern on the base plate 20 to allow for the accessories 22 to be mounted in various different locations as needed. In one example, the mounting apertures 30 are formed to have a diamond shape and are larger in size then the power apertures 36 and locking apertures 38.

In one example, the mounting apertures 30 are formed in a four corner pattern with a center power aperture 36 between the four corners, and with locking apertures 38 between adjacent mounting apertures 30. This pattern provides for easy and quick connect/disconnect. When the accessory 22 is attached to the base plate 20, the extensions 32 are inserted into the corresponding mounting apertures 30 to mechanically attach the accessory 22 to the base plate 20 in one of the plurality of mounting orientations. The accessory 22 can then be selectively detached from one mounting orientation on the base plate 20 such that the accessory 22 can immediately be reattached in a different one of the mounting orientations.

In one example, the primary surface 34 of the accessory 22 comprises a sheet metal plate body 46 as shown in FIGS.

Figure 5:
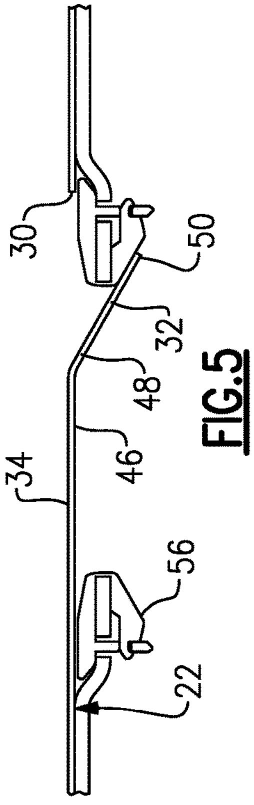
FIG. 5 is a section side view of a tab received within a mounting aperture.
Figure 6:
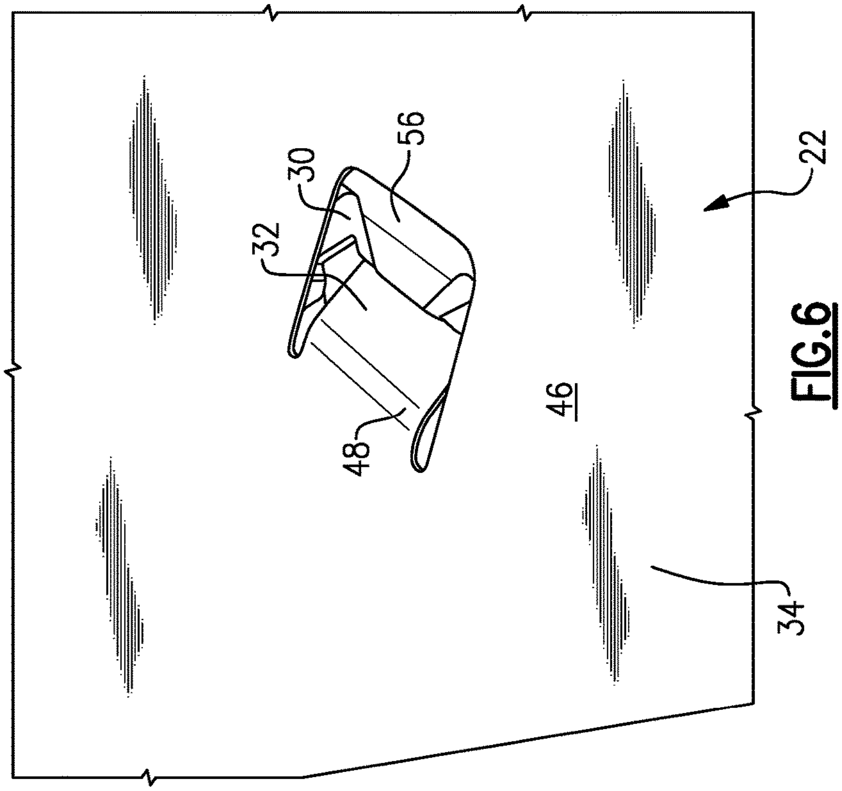
FIG. 6 is a top perspective view of FIG. 5.
Figure 8B:
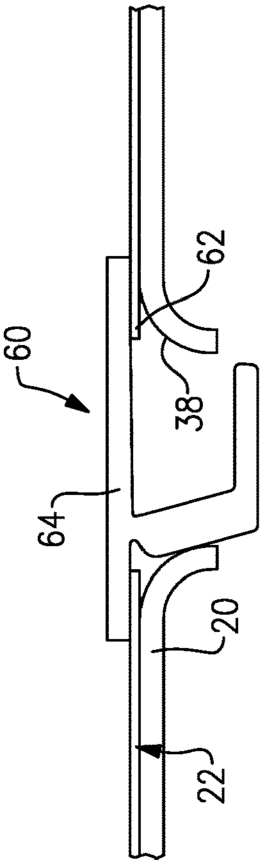
FIG. 8B is a side section view of FIG. 8A.
Figure 8A:
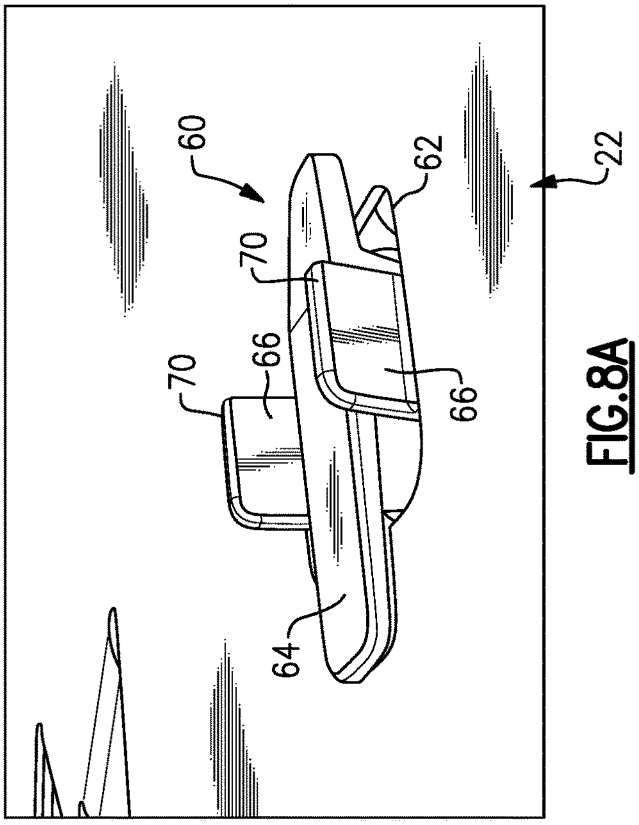
FIG. 8A is a side perspective view of a lock insert of the accessory plate attached to the base plate.

3-4. The secondary surface 40 and support structure 42 of the accessory 22 are not shown in FIGS. 3-4 for purposes of clarity. In one example, the tabs 32 are integrally formed with the sheet metal plate body 46, with each tab 32 comprising a base 48 formed with the sheet metal plate body 46 and extending to a distal end 50 that is free from contact with the sheet metal plate body 46 as shown in FIGS. 5-6.

Methods such as cutting, punching, etc., for example, can be used to form the tabs 32 before they are bent to a desired angle relative to the primary surface 34. In one example, a method includes separating portions of each tab 32 from the sheet metal plate body 46 leaving only the base portion 48 attached to the sheet metal plate body 46, and bending each tab 32 at the base portion 48 such that a distal end 50 of each tab 32 is free from contact with the sheet metal plate body 46 and extends at a desired angle. In one example, the tabs 32 are bent away from the sheet metal plate body 46 in a direction toward the base plate 20.

The tabs 32 can have different arrangements. In one example, the tabs 32 comprise a first set of tabs 52 (FIG. 3) and a second set of tabs 54 (FIG. 4) that are different than the first set of tabs 52. In one example shown in FIG. 3, the first set of tabs 52 comprises two tabs 32 that are received within a single mounting aperture 30. In one example shown in FIG. 4, the second set of tabs 54 comprises a single tab 32 that are received within a single mounting aperture 30. Each accessory can have multiple sets of tabs 52 or 54. In the examples shown, there are six sets of tabs per accessory 22; however, fewer sets could be used or additional sets could be added as needed.

In one example, the two tabs 32 from the first set of tabs 52 are smaller in size and fit against adjacent sides of the diamond-shaped mounting aperture 30 to facilitate centering of the mounting interface within the aperture 30. Each pair of tabs 32 in the first set 52 of tabs are configured to be angled away from each other such that adjacent edges of the bases 48 are closer to each other than adjacent edges of the distal ends 50 on a plane defined by the primary surface 34. In other words, for each pair of tabs 32 that fit in a single aperture 30, the associated distal ends 50 extend away, i.e. diverge, from each other.

In one example, the single tab 32 of the second set of tabs 54 is greater in size than each of the two tabs 32 in the first set of tabs 52. This larger size tab 32 can fit securely and snugly along a single side of the diamond-shaped mounting aperture 30 to hold the accessory 22 in place. In one example, adjacent pairs of the single tabs 32 are angled relative to the primary surface 34 towards each other such that the distal ends 50 face each other as shown in FIG. 4.

In the example shown in FIGS. 5-6, the mounting aperture includes an optional insert 56. The insert 56 can facilitate guiding the tabs 32 into place.

In one example, the accessory 22 also includes a lock insert 60 to secure the accessory 22 to the base plate 20. In one example, the lock insert 60 is received within a lock aperture 38 spaced from the plurality of mounting apertures 30. In one example, the lock aperture 38 has a different size and/or shape than the plurality of mounting apertures 30. In the example shown, the lock aperture 38 is smaller in size than the mounting aperture 30.

In one example, the primary surface 34 of the accessory 22 includes one or more insert openings 62 that are located between sets 52, 54 of the tabs 32. The lock insert 60 can either be inserted into the insert opening 62, or the lock inserted can be permanently fixed, e.g. molded, to the primary surface 34.

Figure 7:
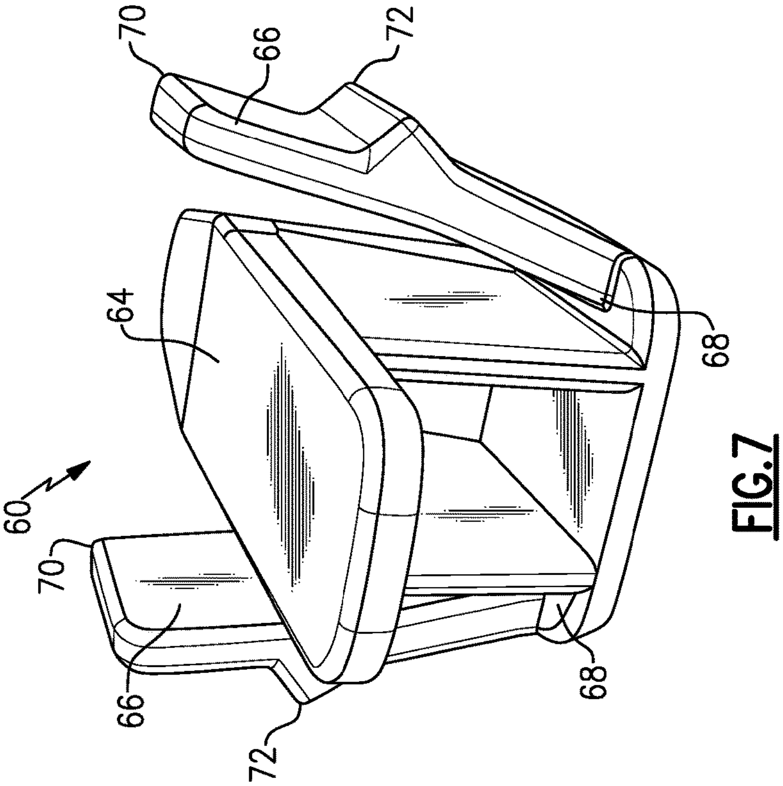
FIG. 7 is a perspective view of a lock insert.
Figure 9B:
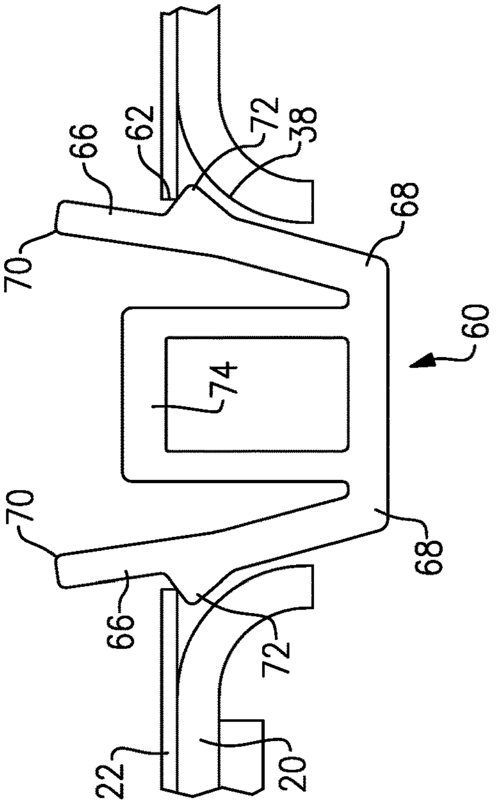
FIG. 9B is an end section view of FIG. 9A.
Figure 9A:
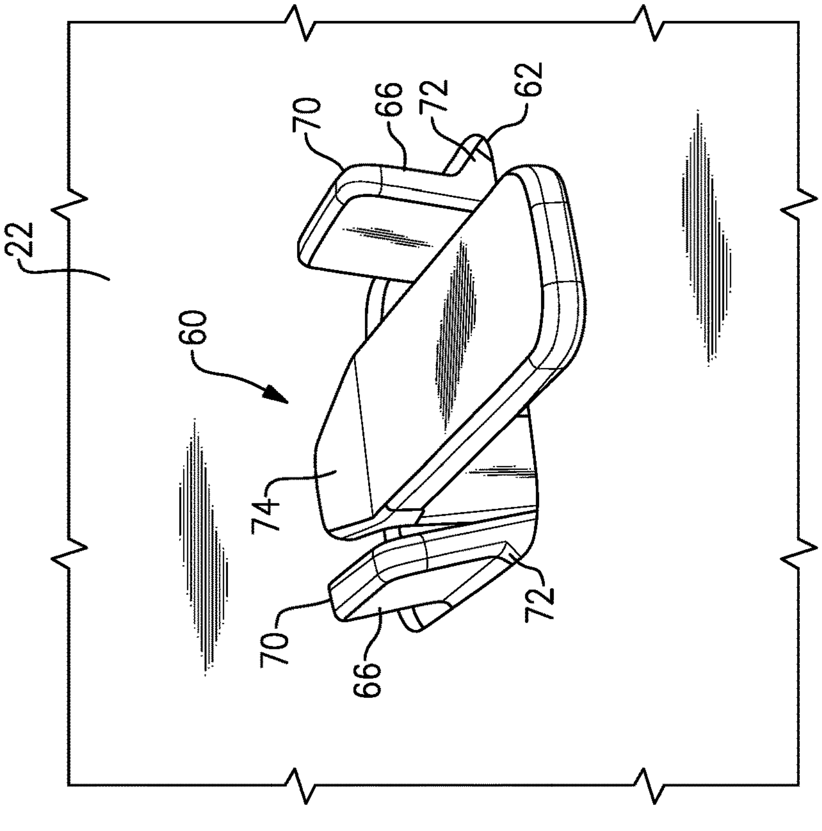
FIG. 9A is an end perspective view of a lock insert of the accessory plate attached to the base plate.

In one example, the lock insert 60 comprises a center body 64 with a pair of resilient arms 66 that are selectively moveable between an installed position (FIGS. 8A-B and 9A-B) and an uninstalled position (FIG. 7). Each arm 66 has a base end 68 formed with the center body 64 and extends to a distal end 70 that is spaced from the center body 64. Each arm 66 also includes a snap tang 72 facing outwardly of the arm 66 at a location between base end 68 and the distal end 70. To lock the accessory 22 to the plate body 46, the distal ends 50 of the arms 66 are squeezed or compressed towards each other such that the center body 64 and snap tangs 72 can be slid through the insert opening 62. Once the snap tangs 72 clear the opening 62, the arms 66 are released and the snap tangs 72 engage a lower surface of the plate body 46 as shown in FIGS. 9A-9B. Once the insert 60 is attached to the accessory 22, the arms 66 are held in place to provide a wedging effect during insertion into the lock aperture 38 as best shown in FIG. 9B. The arms 66 are closest to each other at their base ends 68 and then taper or diverge away from each other in a direction extending toward their distal ends 70.

The subject disclosure provides an integrated attachment structure/interface onto an accessory to provide a simple low price and easy to manufacture accessory. No tools or fasteners are needed for fast and easy attachment of the accessory to the pattern of mounting apertures on the base plate. As the tabs are folded out from a primary surface of the accessory itself, the accessory can be directly attached to the base plate without requiring an adapter plate.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An accessory attachment system, comprising:
- a base plate having a plurality of mounting apertures;
- an accessory having a primary surface with an attachment interface and a secondary surface providing a support structure to hold one or more items, wherein the attachment interface comprises one or more tabs that are bent outwardly of the primary surface and received within selected mounting apertures of the plurality of mounting apertures;
- wherein the one or more tabs comprise a first set of tabs for a first accessory or a second set of tabs different than the first set of tabs for a second accessory;
- wherein the first set of tabs comprises two tabs that are received within a single aperture of the plurality of mounting apertures;
- wherein the second set of tabs comprises a single tab that is received within a single aperture of the plurality of mounting apertures; and
- wherein the single tab of the second set of tabs is greater in size than each of the two tabs in the first set of tabs.

2. The accessory attachment system of claim 1, wherein the base plate is mounted within a cargo area of a vehicle.

3. The accessory attachment system of claim 1, wherein the base plate has a plurality of power connection apertures and a plurality of lock apertures, wherein the plurality of mounting apertures, the plurality of power connection apertures, and the plurality of lock apertures form sets of apertures that are formed in a desired pattern on the base plate, and wherein the desired pattern is formed with mounting apertures positioned at four corners in a four corner pattern with one power aperture centered between the four corners, and with locking apertures positioned between adjacent mounting apertures.

4. The accessory attachment system of claim 1, wherein the primary surface comprises a sheet metal plate.

5. The accessory attachment system of claim 4, wherein the one or more tabs are integrally formed with the sheet metal plate, with each tab comprising a base formed with the sheet metal plate and extending to a distal end that is free from contact with the sheet metal plate.

6. The accessory attachment system of claim 1, including a lock insert to secure the accessory to the base plate, wherein the lock insert is received within a lock aperture.

7. The accessory attachment system of claim 6, wherein the lock aperture has a different size and/or shape than the plurality of mounting apertures.

8. The accessory attachment system of claim 6, wherein the lock insert comprises a center body and a pair of resilient arms that are selectively moveable between an installed position and an uninstalled position, each arm has a base end formed with the center body and extends to a distal end that is spaced from the center body and extends outward of the lock aperture on the primary surface.

9. A vehicle comprising:

a cargo area having a bottom wall and one or more side walls;

one or more base plates attached to the bottom wall and/or to one or more of the side walls;

each base plate having a plurality of mounting apertures and a plurality of lock apertures, wherein each lock aperture is spaced from each mounting aperture;

at least one accessory having a primary surface with an attachment interface and a secondary surface providing a support structure to hold one or more items, wherein the primary surface comprises a sheet metal plate, and wherein the attachment interface comprises a plurality of tabs that are bent outwardly of the primary surface and are received within selected mounting apertures of the plurality of mounting apertures, and wherein the plurality of tabs are integrally formed with the sheet metal plate, with each tab comprising a base formed with the sheet metal plate and extending to a distal end that is free from contact with the sheet metal plate;

the plurality of tabs comprise a first set of tabs for a first accessory or a second set of tabs for a second accessory, the first set of tabs comprising two tabs that are received within a single aperture of the plurality of mounting apertures and the second set of tabs comprising a single tab that is received within a single aperture of the plurality of mounting apertures, and wherein the single tab of the second set of tabs is greater in size than each of the two tabs in the first set of tabs; and at least one lock insert supported by the at least one accessory and selectively securable within one lock aperture of the plurality of lock apertures, and wherein the lock insert includes a portion that is selectively moveable between an installed position and an uninstalled position, wherein the portion extends outward of the lock aperture on the primary surface.

10. The vehicle of claim 9, wherein each base plate has the plurality of mounting apertures, a plurality of power connection apertures, and a plurality of lock apertures, wherein:

each lock aperture is spaced from each mounting aperture;

each power connection aperture is spaced from each mounting aperture and each lock aperture;

the plurality of lock apertures and the plurality of power connection apertures have a different size and/or shape than the plurality of mounting apertures; and the plurality of mounting apertures, plurality of power connection apertures, and plurality of lock apertures form sets of apertures that are formed in a desired pattern on the base plate, with the desired pattern being provided at multiple locations on the base plate.

11. The vehicle of claim 9, wherein the at least one lock insert comprises a center body, and wherein the portion comprises a pair of opposing arms that are selectively movable between the installed position and the uninstalled position, and each arm has a base end formed with the center body and extends to a distal end that is spaced from the center body and extends outward of the lock aperture on the primary surface.

12. The vehicle of claim 11, wherein each arm of the pair of opposing arms includes a grip or tang.

13. A method comprising:

forming a base plate to include a plurality of mounting apertures, a plurality of power connection apertures, and a plurality of lock apertures, wherein:

each lock aperture is spaced from each mounting aperture;

each power connection aperture is spaced from each mounting aperture and each lock aperture;

the plurality of lock apertures and the plurality of power connection apertures have a different size and/or shape than the plurality of mounting apertures;

the plurality of mounting apertures, plurality of power connection apertures, and plurality of lock apertures form sets of apertures that are formed in a desired pattern on the base plate, with the desired pattern being provided at multiple locations on the base plate; and forming the desired pattern with mounting apertures positioned at four corners in a four corner pattern with one power aperture centered between the four corners, and with locking apertures being positioned between adjacent mounting apertures:

integrally forming a plurality of bent tabs on a primary surface of an accessory; and inserting the plurality of bent tabs through selected mounting apertures formed within the base plate.

14. The method of claim 13, wherein the primary surface comprises a sheet metal plate, and including separating portions of each tab from the sheet metal plate leaving only a base portion attached to the sheet metal plate, and bending each tab at the base portion such that a distal end of each tab is free from contact with the sheet metal plate.

15. The method of claim 13, including inserting a lock insert supported by the primary surface into a lock aperture that is spaced apart from the mounting apertures, and wherein the lock insert includes a portion that is selectively moveable between an installed position and an uninstalled position, wherein the portion extends outward of the lock aperture on the primary surface.

16. The method of claim 15, wherein the lock insert comprises a center body and wherein the portion comprises a pair of resilient arms that are selectively moveable between an installed position and an uninstalled position, each arm has a base end formed with the center body and extends to a distal end that is spaced from the center body and extends outward of the lock aperture on the primary surface.

17. A method comprising:

integrally forming a plurality of bent tabs on a primary surface of an accessory;

inserting the plurality of bent tabs through mounting apertures formed within a base plate supported within a vehicle cargo area; and wherein the plurality of bent tabs for each accessory comprise either a first set of tabs for a first accessory or a second set of tabs for a second accessory, and including providing the first set of tabs as two tabs that are received within a single mounting aperture of the mounting apertures, and providing the second set of tabs as a single tab that is received within a single mounting aperture of the mounting apertures, and further including forming the single tab of the second set of tabs to be greater in size than each of the two tabs in the first set of tabs.

* * * * *